US011906921B2

(12) United States Patent
Oya

(10) Patent No.: US 11,906,921 B2
(45) Date of Patent: Feb. 20, 2024

(54) IMAGE FORMING APPARATUS CAPABLE OF FORMING TONER IMAGE WITH DESIRED AMOUNT OF TONER, CONTROL METHOD FOR THE IMAGE FORMING APPARATUS, AND STORAGE MEDIUM

(71) Applicant: CANON KABUSHIKI KAISHA, Tokyo (JP)

(72) Inventor: Hiroshi Oya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/692,307

(22) Filed: Mar. 11, 2022

(65) Prior Publication Data

US 2022/0299925 A1 Sep. 22, 2022

(30) Foreign Application Priority Data

Mar. 16, 2021 (JP) ................................ 2021-042472

(51) Int. Cl.
*G03G 15/00* (2006.01)
*G03G 21/02* (2006.01)

(52) U.S. Cl.
CPC ....... *G03G 15/556* (2013.01); *G03G 15/5008* (2013.01); *G03G 21/02* (2013.01); *G03G 15/5016* (2013.01); *G03G 2215/00949* (2013.01)

(58) Field of Classification Search
CPC .. G03G 15/556; G03G 15/5008; G03G 21/02; G03G 2215/00531; G03G 2215/00755; G03G 2215/00949
USPC ..................................................... 399/43, 85
See application file for complete search history.

(56) References Cited

U.S. PATENT DOCUMENTS 10,451,992 B2 10/2019 Yamada
2002/0064389 A1* 5/2002 Semma ................ G03G 15/556 399/24
2008/0260396 A1* 10/2008 Yamada ............... G03G 15/553 399/27
2009/0244586 A1* 10/2009 Sei ....................... G03G 15/502 358/1.15
2011/0007359 A1* 1/2011 Yamakawa .......... G03G 15/556 358/1.15

(Continued)

FOREIGN PATENT DOCUMENTS

JP 2018054862 A 4/2018

*Primary Examiner* — Robert B Beatty
(74) *Attorney, Agent, or Firm* — ROSSI, KIMMS & McDOWELL LLP

(57) ABSTRACT

An image forming apparatus that is capable of properly grasping a load that is imposed on the image forming apparatus by performing high-chroma printing. The image forming apparatus includes a printer engine that causes a heating rotary body to support and convey a sheet with a toner image formed thereon and performs an image formation on the sheet. The printer engine is controlled to perform the image formation on sheets in a first mode in which a toner image based on a piece of image data is formed with a first amount of toner, or a second mode in which a toner image based on the piece of image data is formed with a second amount of toner larger than the first amount of toner. A count function for counting the number of times of the image formation performed in the second mode, rather than the first mode, is performed.

21 Claims, 12 Drawing Sheets

| PRINT OPERATION MODE | PRINT SPEED [PPM] | LIMIT THRESHOLD FOR TOTAL TONER APPLICATION AMOUNT [%] | DRUM ROTATIONAL SPEED REDUCTION CONTROL |
|---|---|---|---|
| NORMAL MODE | 45 | 150 | OFF |
| HIGH-CHROMA MODE | 15 | 200 | ON |

(56) References Cited

U.S. PATENT DOCUMENTS

| | | | | |
|---|---|---|---|---|
| 2011/0135336 | A1* | 6/2011 | Yamamoto | G03G 21/02 399/79 |
| 2011/0135337 | A1* | 6/2011 | Saito | G03G 15/553 399/79 |
| 2015/0153696 | A1* | 6/2015 | Oya | G03G 15/556 399/82 |
| 2019/0158699 | A1* | 5/2019 | Oya | H04N 1/34 |

* cited by examiner

FIG. 5

| PRINT OPERATION MODE | PRINT SPEED [PPM] | LIMIT THRESHOLD FOR TOTAL TONER APPLICATION AMOUNT [%] | DRUM ROTATIONAL SPEED REDUCTION CONTROL |
|---|---|---|---|
| NORMAL MODE | 45 | 150 | OFF |
| HIGH-CHROMA MODE | 15 | 200 | ON |

FIG. 6

| DATE OF OCCURRENCE | ERROR CODE | PRINT COUNTER [PAGE] | HIGH-CHROMA PRINT COUNTER FOR FIXING/TRANSFER UNIT [PAGE] |
|---|---|---|---|
| 2020/1/23 | 100-0000 | 10000 | 2000 |
| 2020/5/30 | 200-0000 | 20000 | 3000 |
| 2020/10/7 | 300-0000 | 30000 | - |

*FIG. 7*

| SERIAL NO. (701) | REMAINING CARTRIDGE LEVEL WHEN ATTACHED [%] (702) | REMAINING CARTRIDGE LEVEL WHEN USED LAST [%] (703) | PRINT COUNTER [PAGE] (704) | HIGH-CHROMA PRINT COUNTER FOR DEVELOPING DEVICE [PAGE] (705) | HIGH-CHROMA PRINT COUNTER FOR TONER [PAGE] (706) |
|---|---|---|---|---|---|
| 1234567890 | 100 | 40 | 1000 | 150 | 120 |
| 2345678901 | 100 | 0 | 2000 | 0 | 0 |
| 5678901234 | 200 | 0 | 1500 | 300 | 250 |

*FIG. 8*

800

| COUNTER NAME (801) | COUNTER ID (802) | COUNTER ATTRIBUTE (803) | COUNT-UP CONDITIONS (804) |
|---|---|---|---|
| TOTAL COUNTER | 7001 | MAIN BODY | AT START OF SHEET FEEDING IN NORMAL PRINTING OR AT START OF SHEET FEEDING IN HIGH-CHROMA PRINTING |
| HIGH-CHROMA PRINT COUNTER FOR FIXING/TRANSFER UNIT | 7002 | MAIN BODY | AT START OF SHEET FEEDING IN HIGH-CHROMA PRINTING AND WHEN TOTAL TONER APPLICATION AMOUNT HAS BECOME LARGER THAN 150% |
| PRINT COUNTER FOR DRUM CARTRIDGE | 7101 | DRUM CARTRIDGE | AT START OF SHEET FEEDING IN NORMAL PRINTING OR AT START OF SHEET FEEDING IN HIGH-CHROMA PRINTING |
| HIGH-CHROMA PRINT COUNTER FOR DRUM | 7102 | DRUM CARTRIDGE | AT START OF SHEET FEEDING IN HIGH-CHROMA PRINTING AND WHEN DRUM ROTATIONAL SPEED REDUCTION CONTROL HAS BEEN PERFORMED |
| PRINT COUNTER FOR TONER CARTRIDGE | 7201 | TONER CARTRIDGE | AT START OF SHEET FEEDING IN NORMAL PRINTING OR AT START OF SHEET FEEDING IN HIGH-CHROMA PRINTING |
| HIGH-CHROMA PRINT COUNTER FOR DEVELOPING DEVICE | 7202 | TONER CARTRIDGE | AT START OF SHEET FEEDING IN HIGH-CHROMA PRINTING AND WHEN DRUM ROTATIONAL SPEED REDUCTION CONTROL HAS BEEN PERFORMED |
| HIGH-CHROMA PRINT COUNTER FOR TONER | 7203 | TONER CARTRIDGE | AT START OF SHEET FEEDING IN HIGH-CHROMA PRINTING AND WHEN TOTAL TONER APPLICATION AMOUNT HAS BECOME LARGER THAN 150% |

FIG. 11

| PRINT DATA (1101) | PRINT OPERATION MODE (1102) | TONER APPLICATION AMOUNT AFTER AMOUNT LIMITATION (1103) | FINAL TONER APPLICATION AMOUNT (TOTAL IN ALL COLORS) (1104) | COUNT-UP RESULTS IN COUNTERS #7002 AND #7203" (1105) | COUNT-UP RESULTS IN COUNTERS #7102 AND #7202 (1106) |
|---|---|---|---|---|---|
| C 70% IMAGE | NORMAL MODE | C70% | 70% | × | × |
| | HIGH-CHROMA MODE | C70% | 140% | × | ○ |
| Y 100% IMAGE | NORMAL MODE | Y100% | 100% | × | × |
| | HIGH-CHROMA MODE | Y100% | 200% | ○ | ○ |
| YMCK 50% IMAGE | NORMAL MODE | YMCK37% | 148% | × | × |
| | HIGH-CHROMA MODE | YMCK50% | 400% | ○ | ○ |
| YMCK 5% IMAGE | NORMAL MODE | YMCK5% | 20% | × | × |
| | HIGH-CHROMA MODE | YMCK5% | 40% | × | ○ |

IMAGE FORMING APPARATUS CAPABLE OF FORMING TONER IMAGE WITH DESIRED AMOUNT OF TONER, CONTROL METHOD FOR THE IMAGE FORMING APPARATUS, AND STORAGE MEDIUM

BACKGROUND OF THE INVENTION

Field of the Invention

The present invention relates to image forming apparatuses, control methods for the image forming apparatus, and storage media.

Description of the Related Art

Electrophotographic image forming apparatuses are configured to record an image onto a recording sheet by forming an electrostatic latent image on a photosensitive drum, developing the electrostatic latent image by applying toner onto the photosensitive drum using a developing device, and transferring the toner from the photosensitive drum onto a recording sheet. For such image forming apparatuses, there has been proposed a method to improve the chroma of output images by varying the circumferential-surface speed ratio of a developing roller to the photosensitive drum, increasing the amount of toner supplied to the photosensitive drum, changing color conversion coefficients to make appropriate color adjustments, and increasing the density of output images (see, for example, Japanese Laid-Open Patent Publication (Kokai) No. 2018-054862). Printing using the method that improves the chroma of images as described above is called high-chroma printing.

Although the high-chroma printing improves the chroma of images, it tends to apply heavier loads to components of image forming apparatuses than normal printing. Examples of the loads include a tendency of a sheet to wrap around a fixing device, a tendency of a transfer unit to become contaminated due to toner spattering, shortening of the lifetime of a toner cartridge, and shortening of the lifetime of the developing device and the photosensitive drum. Such loads affect the replacement timing of the components, and hence there is demand for image forming apparatuses capable of properly grasping loads that are imposed on the image forming apparatuses due to implementation of the high-chroma printing.

SUMMARY OF THE INVENTION

The present disclosure provides image forming apparatuses capable of properly grasping loads that are imposed on the image forming apparatuses due to implementation of high-chroma printing, control methods for the image forming apparatuses, and storage media.

According to one or more aspects of the present disclosure, an image forming apparatus comprises a printer engine that causes a heating rotary body to support and convey a sheet with a toner image formed thereon and performs an image formation on the sheet. The image forming apparatus further comprises at least one memory and at least one processor. The at least one processor executes instructions stored in the at least one memory to control the printer engine to perform the image formation on sheets in a first mode or a second mode, and perform a specific count function for counting the number of times of the image formation performed in the second mode without counting the number of times of the image formation performed in the first mode. The first mode is a mode in which a toner image based on a piece of image data is formed with a first amount of toner, and the second mode is a mode in which a toner image based on the piece of image data is formed with a second amount of toner larger than the first amount of toner.

According to one or more aspects of the present disclosure, an image forming apparatus comprises a printer engine in which a developer carrying rotary body that carries toner and an image carrying rotary body that carries a toner image developed by the toner supplied from the developer carrying rotary body are located while a circumferential surface of the developer carrying rotary body and a circumferential surface of the image carrying rotary body face each other. The image forming apparatus further comprises at least one memory and at least one processor. The at least one processor executes instructions stored in the at least one memory to control the printer engine to perform an image formation on sheets in a first mode or a second mode, and perform a specific count function for counting the number of times of the image formation performed in the second mode without counting the number of times of the image formation performed in the first mode. The first mode is a mode in which rotation of the developer carrying rotary body and the image carrying rotary body is controlled such that moving directions of the circumferential surfaces facing each other are the same, and a speed difference between the circumferential surfaces facing each other is a first speed difference. The second mode is a mode in which rotation of the developer carrying rotary body and the image carrying rotary body is controlled such that moving directions of the circumferential surfaces facing each other are the same, and a speed difference between the circumferential surfaces facing each other is a second speed difference greater than the first speed difference.

According to one or more aspects of the present disclosure, a control method is provided for an image forming apparatus including a printer engine that causes a heating rotary body to support and convey a sheet with a toner image formed thereon and performs an image formation on the sheet. The control method comprises controlling the printer engine to perform the image formation on sheets in a first mode in which a toner image based on a piece of image data is formed with a first amount of toner, or a second mode in which a toner image based on the piece of image data is formed with a second amount of toner larger than the first amount of toner. The control method further comprises performing a specific count function for counting the number of times of the image formation performed in the second mode without counting the number of times of the image formation performed in the first mode.

According to one or more aspects of the present disclosure, a control method is provided for an image forming apparatus including a printer engine in which a developer carrying rotary body that carries toner and an image carrying rotary body that carries a toner image developed by the toner supplied from the developer carrying rotary body are located while a circumferential surface of the developer carrying rotary body and a circumferential surface of the image carrying rotary body face each other. The control method comprises controlling the printer engine to perform an image formation on sheets in a first mode or a second mode. The first mode is a mode in which rotation of the developer carrying rotary body and the image carrying rotary body is controlled such that moving directions of the circumferential surfaces facing each other are the same, and a speed difference between the circumferential surfaces facing each other is a first speed difference. The second mode is a mode in which rotation of the developer carrying rotary body and the image carrying rotary body is controlled such that moving directions of the circumferential surfaces facing each other are the same, and a speed difference between the circumferential surfaces facing each other is a second speed difference greater than the first speed difference. The control method further comprises performing a specific count function for counting the number of times of the image formation performed in the second mode without counting the number of times of the image formation performed in the first mode.

The present disclosure makes it possible for the image forming apparatuses to properly grasp the loads that are imposed on the image forming apparatuses due to implementation of high-chroma printing.

Further features of the present disclosure will become apparent from the following description of exemplary embodiments (with reference to the attached drawings).

BRIEF DESCRIPTION OF THE DRAWINGS

FIG. 5 is a view illustrating an example of operation mode settings stored in a nonvolatile memory.

FIG. 6 is a view illustrating an example of information that is transmitted as information about service errors to a management server.

FIG. 7 is a view illustrating an example of a cartridge log.

FIG. 8 is a view illustrating an example of a counter table that is managed by a counter management unit.

FIG. 11 is a view illustrating of count-up results from the count-up process in FIG. 10.

DESCRIPTION OF THE EMBODIMENTS

Various exemplary embodiments, features, and aspects of the disclosure will be described in detail below with reference to the drawings. One or more aspects of the present disclosure will be described hereinafter with reference to the appended drawings. Note that the disclosure according to the scope of claims is not limited to the embodiments described below, and all of the combinations of the properties described in the embodiments are not necessarily required for aspects of the present disclosure.

The present disclosure is applicable to both of monochrome and multi-color electrophotographic image formation apparatuses such as a copier, a multifunction peripheral, a laser printer (Single Function Peripheral which is hereafter referred to as "SFP"), and a facsimile. It should be noted that, in the following embodiments, an SFP specialized for printing will be described as an exemplary image formation apparatus according to the present disclosure.

Figure 1:
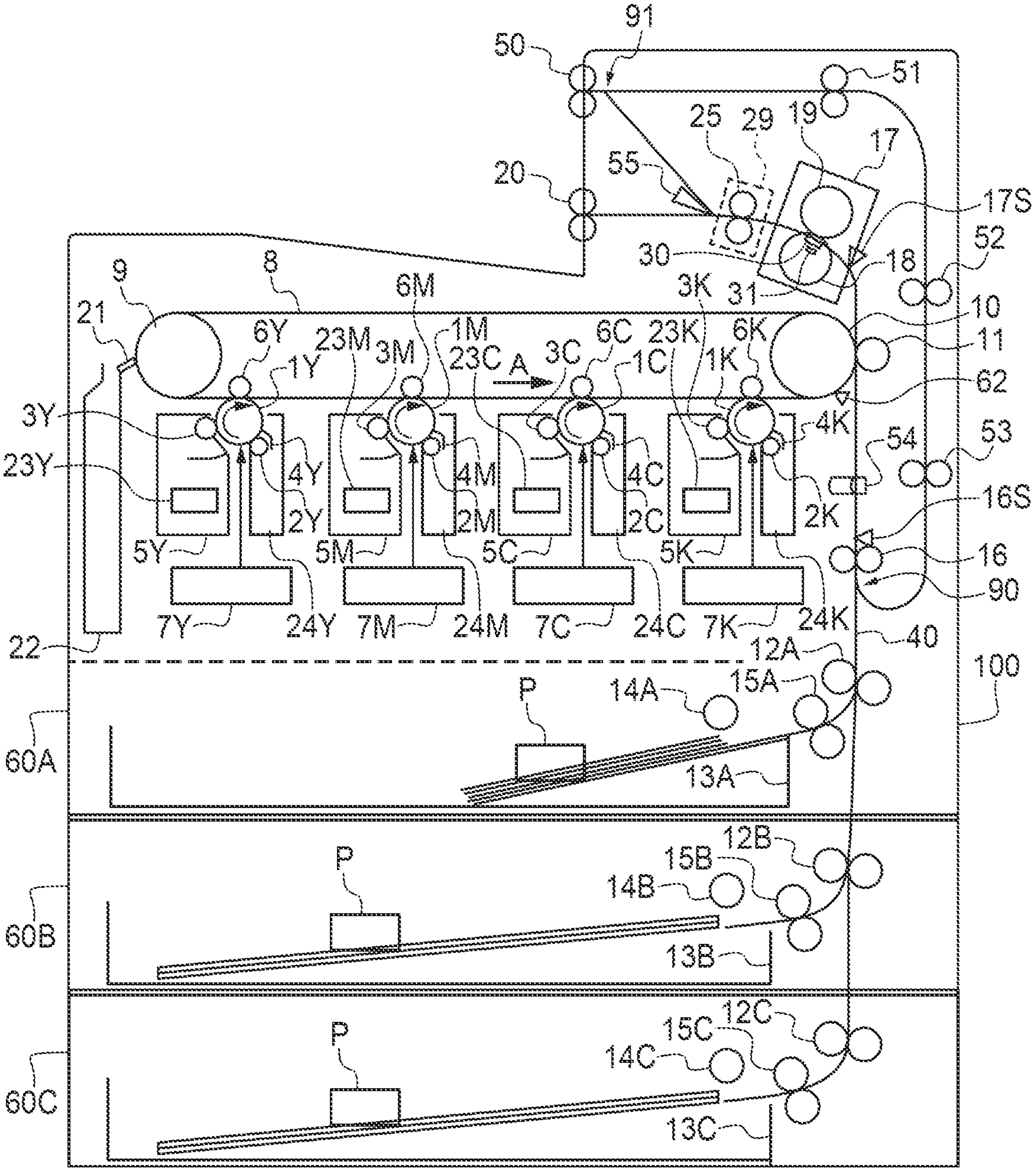
FIG. 1 is a side view of an SFP according to one or more aspects of the present disclosure.

FIG. 1 is a side view of the SFP 100 according to the present embodiment. It should be noted that in FIG. 1, the SFP 100 is illustrated so that its internal contents can be seen through for ease of understanding. The SFP 100 is a laser printer which uses an electrophotographic image forming process and is configured to form a multicolor image on a recording material using developer (toners) in multiple colors (four colors consisting of CMYK). The SFP 100 includes process stations 5Y, 5M, 5C, and 5K (process cartridges), which are configured to be detachable from the SFP 100. The four process stations 5Y, 5M, 5C, and 5K have the same structure but differs in that they form images with toners (developer) in different colors i.e., yellow (Y), magenta (M), cyan (C), and black (K). The process stations 5Y, 5M, 5C, and 5K include toner containers 23Y, 23M, 23C, and 23K, photosensitive drums 1Y, 1M, 1C, and 1K (image carrying rotary bodies), charging rollers 2Y, 2M, 2C, and 2K, developing rollers 3Y, 3M, 3C, and 3K (developer carrying rotary bodies), cleaning blades 4Y, 4M, 4C, and 4K, and residual toner collecting containers 24Y, 24M, 24C, and 24K, respectively. Exposure devices 7Y, 7M, 7C, and 7K are placed below the respective process stations 5Y, 5M, 5C, and 5K. The exposure devices 7Y, 7M, 7C, and 7K expose the respective photosensitive drums 1Y, 1M, 1C, and 1K based on image signals. It should be noted that the characters YMCK are omitted from the following description except when a specific process station is described.

The photosensitive drums 1 are uniformly charged to a predetermined polarity and voltage by the respective charging rollers 2 while the photosensitive drums 1 are rotated. The exposure devices 7 perform image-exposure on the respective photosensitive drums 1 so as to form electrostatic latent images corresponding to first to fourth color component images (yellow, magenta, cyan, and black component images) for a target color image on the respective photosensitive drums 1. The charging rollers 2 rotate in a manner following the rotation of the photosensitive drums 1. The exposure devices 7 used in the present embodiment are polygon scanners using laser diodes and configured to form images on the respective photosensitive drums 1 by radiating laser beams modulated according to image information, thereby forming electrostatic latent images on the respective photosensitive drums 1. In the main scanning direction (a direction vertical to a sheet conveying direction), the exposure devices 7 perform laser writing in exposure a predetermined period of time later than a position signal (BD signal) in a polygon scanner on every scan line. To form an image on a sheet, the exposure devices 7 perform the writing at predetermined intervals between the process stations 5Y, 5M, 5C, and 5K in the sub scanning direction (the sheet conveying direction). It allows the exposure devices 7 in the process stations 5 (the process stations 5Y, 5M, 5C, and 5K) to always expose the same areas on the respective photosensitive drums 1 so that color misregistration can be prevented. The electrostatic latent images formed on the photosensitive drums 1 are developed by the developing rollers 3 in the process stations 5. The developing rollers 3 are located with respect to the respective photosensitive drums 1 so that circumferential surfaces of the developing rollers 3 and circumferential surfaces of the respective photosensitive drums 1 face each other, and develop the electrostatic latent images to make toner images by applying the toners in the respective colors to the electrostatic latent images on the photosensitive drums 1. The toners in respective developing devices are negatively-charged non-magnetic mono-component toners, and the electrostatic latent images are developed using a contact-type non-magnetic mono-component developing method. Developing bias is applied to the developing rollers 3 by a developing bias power supply, not illustrated, so that the electrostatic latent images are developed. The developing rollers 3 are controlled by a development control unit 305 in FIG. 3, which will be described later, such that the circumferential surfaces of the developing rollers 3 move in the same direction as the direction in which the circumferential surfaces of the photosensitive drums 1 move. The circumferential speed ratio (or the circumferential-surface speed ratio) of the developing rollers 3 to the photosensitive drums 1 is also controlled by the development control unit 305 in FIG. 3, which will be described later. For example, in high-chroma printing, it is possible to increase the amount of toner supplied to the photosensitive drums 1 per unit area by increasing the circumferential speed ratio of the developing rollers 3 to the photosensitive drums 1 (in other words, increasing the difference in the moving speed or rotating speed between the circumferential surfaces of the developing rollers 3 and the corresponding photosensitive drums 1, which face each other). Moreover, in high-chroma printing, it is possible to increase the amount of toner application can be increased by increasing developing bias and charging bias.

An intermediate belt unit includes an intermediate transfer belt 8 (transfer body), a driving roller 9, and a secondary transfer counter roller 10. Inside the intermediate transfer belt 8, primary transfer rollers 6Y, 6M, 6C, and 6K face the respective photosensitive drums 1Y, 1M, 1C, and 1K. The driving roller 9 is rotated by a motor, not illustrated, causing the intermediate transfer belt 8 to rotate and also causing the secondary transfer counter roller 10 to rotate in a manner following the rotation of the intermediate transfer belt 8. The photosensitive drums 1 rotate in the direction indicated by the illustrated arrows, the intermediate transfer belt 8 rotates in the direction indicated by the arrow A, and a positive primary transfer bias is applied to the primary transfer rollers 6. As a result, toner images on the photosensitive drums 1 are primarily transferred onto the intermediate transfer belt 8 (onto a belt) in order, beginning with the toner image on the photosensitive drum 1Y. After that, the toner images in the four colors in a superimposed state are conveyed to the secondary transfer roller 11. A density sensor 62 detects toner densities of the toner images in the four colors primarily transferred onto the intermediate transfer belt 8.

The cleaning blades 4 for the photosensitive drums 1, which are pressed against the respective photosensitive drums 1, remove residual toner that remains on surfaces of the photosensitive drums 1 without being transferred onto the intermediate transfer belt 8, and other residues on the photosensitive drums 1. A part of a visible or toner image remains on the intermediate transfer belt 8 without being transferred onto a sheet P at the location of the secondary transfer roller 11. Such a visible image remaining on the intermediate transfer belt 8 are unnecessary, and thus is removed by a cleaning operation. In the cleaning operation, the intermediate transfer belt 8 conveys the unnecessary visible image to a cleaning blade 21, and the visible image is scraped off with the cleaning blade 21, the scraped toner is corrected into a residual toner collecting container 22, so that the visible image is to be removed.

Sheets P are stored in feeding cassettes 13A, 13B, and 13C in respective sheet feeding units 60A, 60B, and 60C. For example, sheets P stored in the feeding cassette 13A are conveyed to the secondary transfer roller 11 along a conveyance guide 40 by a pickup roller 14A, a pair of sheet feeding and conveying rollers 15A, a pair of pulling rollers 12A, and a pair of registration rollers 16. A set of a pickup roller 14B, a pair of sheet feeding and conveying rollers 15B, and a pair of pulling rollers 12B, which convey sheets P stored in the feeding cassette 13B, and a set of a pickup roller 14C, a pair of sheet feeding and conveying rollers 15C, and a pair of pulling rollers 12C, which convey sheets P stored in the feeding cassette 13C operate in the same manner. An exemplary sheet feeding unit 60A is a standard feeder that is integral with the SFP 100, and an exemplary sheet feeding unit 60B and an exemplary sheet feeding unit 60C are optional feeders which are detachably attached to the SFP 100 and provided as needed.

When a positive bias is applied to the secondary transfer roller 11, toner images in the four colors on the intermediate transfer belt 8 are transferred onto a sheet P conveyed to the secondary transfer roller 11 (hereafter referred to as "secondary transfer").

A paper type determination sensor 54 is placed at a location downstream of the pair of registration rollers 16, which is a junction of conveyance paths running from the sheet feeding units 60A, 60B, and 60C. To determine a paper type of a sheet P using the paper type determination sensor 54, a sheet feeding motor, not illustrated, is stopped when a leading end of the sheet P surely reaches the location of the paper type determination sensor 54 after a registration sensor 16S detects the leading end of the sheet P. After the sheet feeding motor stops, the paper type determination sensor 54 determines the paper type of the sheet P.

A sheet P onto which toner images have been transferred is conveyed to a fixing device 17 (heating rotary body). The fixing device 17 is a film heating type fixing device. A fixing and ejection sensor 17S detects an arrival of a sheet P at the fixing device 17. The fixing device 17 includes a fixing roller 18 and a pressing roller 19 configured to be pressed against the fixing roller 18, where the fixing roller 18 includes a fixing heater 30 and a built-in fixing thermistor 31 that measures the temperature of the fixing heater 30. By heating and pressing a conveyed sheet P (that is, by supporting and conveying a sheet P on which toner images have been formed), the fixing device 17 fixes the toner images onto the sheet P. The sheet P to which the toner images have been fixed is conveyed by a pair of curl correction rollers 25 in a curl correction mechanism 29 and ejected as an image forming result (e.g., a printed sheet) from the SFP 100 by a pair of ejecting rollers 20.

To perform printing on a second side of a sheet P, which has been supported and conveyed by the fixing device 17, without ejecting the sheet P from the SFP 100, the sheet P that has passed through the fixing device 17 is conveyed to a reversing point 91. A double-sided printing flapper 55 switches the sheet conveying direction between a direction of a sheet ejection and a direction to a reversing unit. To perform double-sided printing, the double-sided printing flapper 55 switches to the direction to the reversing unit before a leading end of the sheet P bearing the images on a first side thereof arrives at the double-sided printing flapper 55. After passing through the reversing point 91, the sheet P is conveyed in the direction of a sheet ejection outside the SFP 100, and while the sheet P lies at the location of a pair of reversing rollers 50 after its trailing end passes through the reversing point 91, the pair of reversing rollers 50 is temporarily stopped. Then, by rotating the pair of reversing rollers 50 in a direction opposite to the previous direction, the sheet P is conveyed toward a double-sided printing conveyance path. The sheet P is conveyed by a pair of first double-sided printing conveyance rollers 51, a pair of second double-sided printing conveyance rollers 52, and a pair of third double-sided printing conveyance rollers 53 in the double-sided printing conveyance path. At a point of junction 90, the double-sided printing conveyance path joins a conveyance path between the pair of sheet feeding and conveying rollers 15A and the pair of registration rollers 16. The pair of registration rollers 16 conveys the sheet P turned upside down to the secondary transfer roller 11. Then, the toner images in the four colors are transferred onto the second side of the sheet P from the intermediate transfer belt 8. The fixing device 17 fixes the toner images transferred onto the second side of the sheet P. By switching the double-sided printing flapper 55 to the direction of the sheet ejection outside the SFP 100, the sheet P bearing the images on both sides thereof is ejected from the SFP 100.

Figure 2:
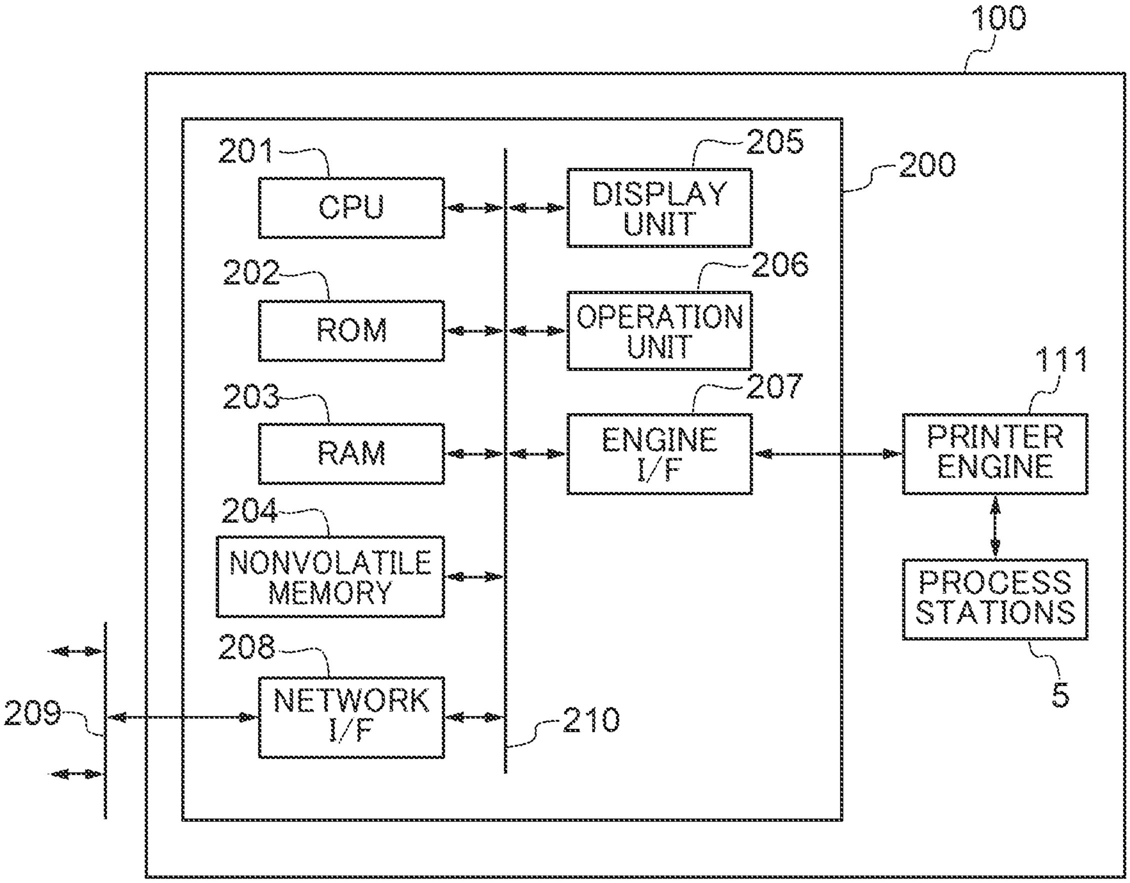
FIG. 2 is a block diagram schematically illustrating a hardware arrangement of the SFP in FIG. 1.

FIG. 2 is a block diagram schematically illustrating a hardware arrangement of the SFP 100 in FIG. 1. Referring to FIG. 2, the SFP 100 includes a controller 200. The controller 200 includes a CPU 201, a ROM 202, a RAM 203, a nonvolatile memory 204, a display unit 205, an operation unit 206, an engine I/F 207, and a network I/F 208. The components of the controller 200 are connected to one another via a system bus 210. A printer engine 111 is connected to the system bus 210 via the engine I/F 207.

The CPU 201 controls the overall operation of the SFP 100. The CPU 201 loads programs stored in the ROM 202 into the RAM 203 and executes them to carry out various processes, which will be described later. The ROM 202, which is a read-only memory, stores a system startup program, a program for controlling a printer engine, character data, character code information, and so forth. The RAM 203, which is a volatile random-access memory, is used as a work area for the CPU 201 and a temporary storage area for various types of data. For example, the RAM 203 is used as a storage area for storing font data additionally registered by downloading, image files received from an external apparatus, and so forth. The nonvolatile memory 204 is a memory with nonvolatility such as a hard disk or a flash memory. Various types of data are spooled into the nonvolatile memory 204, and for example, a cartridge log in FIG. 7 and a counter table in FIG. 8, which will be described later, are stored in the nonvolatile memory 204.

The display unit 205 includes, for example, a liquid crystal display (hereafter referred to as LCD) and displays a setting status of the SFP 100, status of a process in execution, error state, and so forth. The operation unit 206 includes hard keys and an input device such as a touch panel provided on the display unit 205 and receives instructions input by a user. The operation unit 206 is used to, for example, change settings on the SFP 100 and reset the settings, and also used to set an operation mode of the SFP 100 when performing an image forming operation (printing).

The engine I/F 207 functions as an interface for controlling the printer engine 111 in accordance with instructions received from the CPU 201 when printing is performed. Engine control commands and others are sent and received between the CPU 201 and the printer engine 111 via the engine I/F 207. The CPU 201 is capable of accessing information in memory, not illustrated, which the process stations 5 have, via the engine I/F 207 and the printer engine 111. The information in the memory, not illustrated, which the process stations 5 have is count information about pages on which printing has been performed using the process stations 5, information needed to calculate the remaining amount of toner. The network I/F 208 functions as an interface for connecting the SFP 100 to a network 209. It should be noted that the network 209 can be, for example, a local area network (hereafter referred to as LAN) or a telephone network (PSTN). A PC, not illustrated, is connected to the network 209, and for example, image data is transmitted from the PC to the SFP 100, which in turn performs printing of the image data. It should be noted that although the connecting destination of the network 209 is a PC here, it should not always be the PC but may be an information processing terminal such as a server or a tablet. A management server, not illustrated, may be connected to the network 209 so that when a specific event such as a failure of the SFP 100 or replacement of the process stations 5 has occurred, the management server can be notified of this information.

The printer engine 111 performs image formation (prints) on a recording material such as paper based on image data received through the system bus 210 under the control of the CPU 201. The printer engine 111 includes the developing rollers 3 (developer carrying rotary bodies) that carry toners, the photosensitive drums 1 (image carrying rotary bodies) that carry toner images developed by toners supplied from the developing rollers 3, the intermediate transfer belt 8 (transfer body) that transfer the toner images transferred from the photosensitive drums 1 onto a recording material, the fixing device 17 that thermally fixes the toner images transferred onto the recording material, and so forth. The fixing device 17 includes the fixing heater 30 for heating the recording material, and the temperature of the fixing heater 30 at which an image is fixed onto the recording material (fixing temperature) is controlled by the CPU 201.

Figure 3:
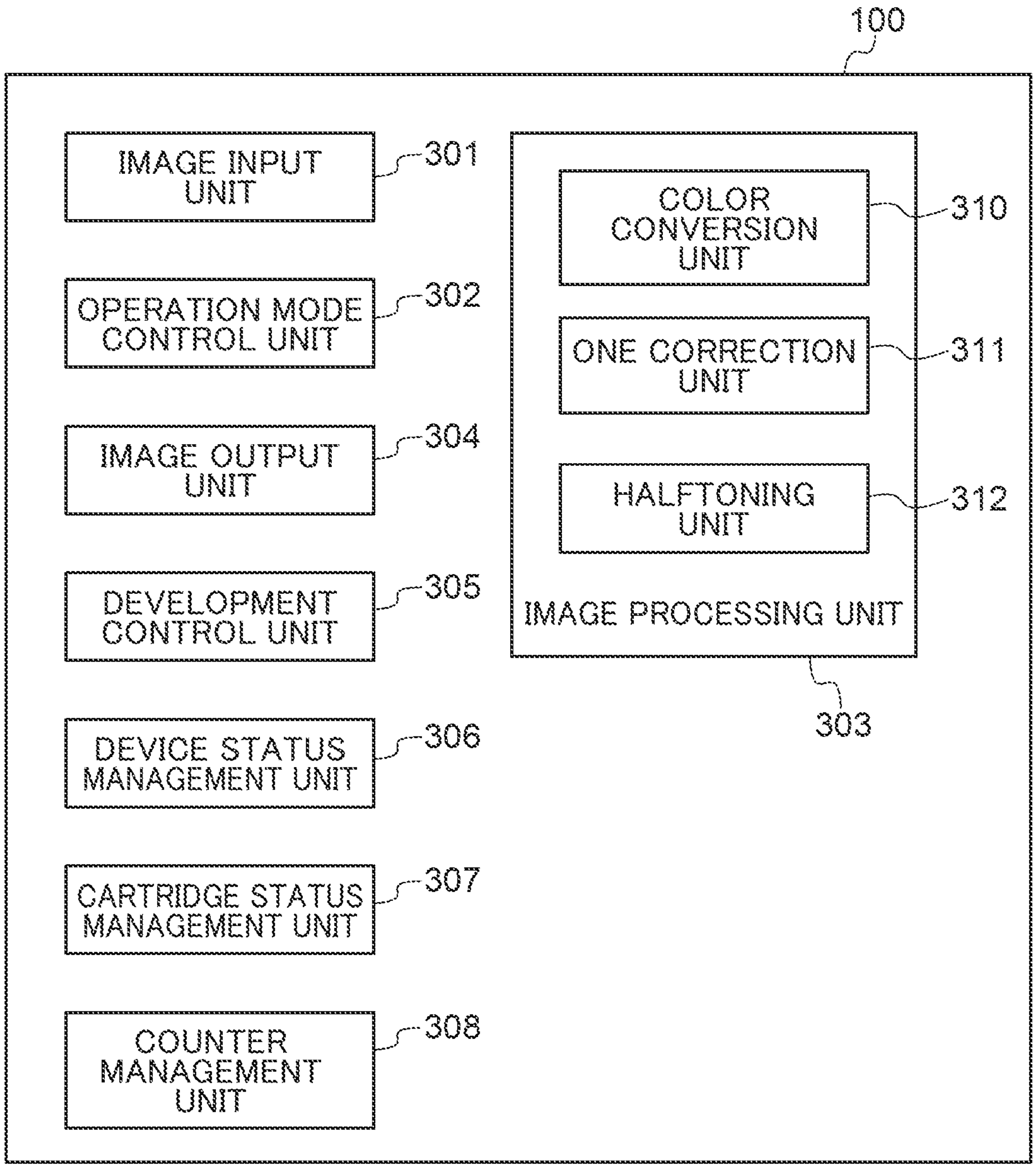
FIG. 3 is a block diagram illustrating a functional arrangement of the SFP in FIG. 1.

FIG. 3 is a block diagram illustrating a functional arrangement of the SFP 100 in FIG. 1. The SFP 100 includes an image input unit 301, an operation mode control unit 302, an image processing unit 303, an image output unit 304, a development control unit 305, a device status management unit 306, a cartridge status management unit 307, and a counter management unit 308, which are components for implementing a printing function. Operations of these components are implemented by the CPU 201 loading programs stored in the ROM 202 into the RAM 203 and executing them.

The image input unit 301 obtains image data to be printed and stores the image data in the RAM 203 or the nonvolatile memory 204. The operation mode control unit 302 determines an operation mode based on a setting input through the operation unit 206 by a user. Specifically, the operation mode control unit 302 sets either of a normal mode and a high-chroma mode as a print operation mode. The high-chroma mode is an operation mode in which the chroma of images is improved, and images are formed with a larger amount of toner than in the normal mode. Namely, a toner image based on a piece of image data is formed with a larger amount of toner than in the normal mode.

Figure 4:
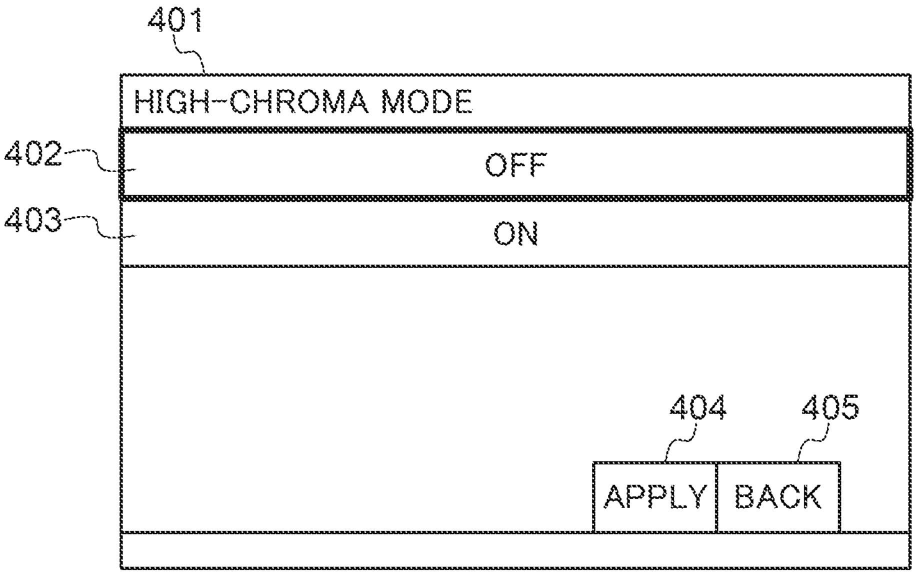
FIG. 4 is a view illustrating an example of an operation mode selection screen that is displayed on a display unit in FIG. 2.

FIG. 4 is a view illustrating an example of an operation mode selection screen 401 that is displayed on the display unit 205 in FIG. 2. The operation mode selection screen 401 includes an OFF button 402, an ON button 403, an apply button 404, and a back button 405. FIG. 4 illustrates an example in which a user has selected the OFF button 402. When a user selects either of the OFF button 402 and the ON button 403 and also depresses the apply button 404, the operation mode control unit 302 is notified of a print operation mode corresponding to the selected button. Specifically, when the selected button is the OFF button 402, the operation mode control unit 302 is notified of the normal mode as the print operation mode. On the other hand, when the selected button is the ON button 403, the operation mode control unit 302 is notified of the high-chroma mode as the print operation mode. The operation mode control unit 302 stores the print operation mode of which it has been notified in the nonvolatile memory 204. Thus, in the present embodiment, the print operation mode has been set. When a user depresses the back button 405, the display screen on the display unit 205 goes back from the operation mode selection screen 401 to a menu screen (not illustrated) without any print operation mode being set.

When the print operation mode has been changed, the operation mode control unit 302 obtains operation mode settings for the changed print operation mode from the nonvolatile memory 204. FIG. 5 is a view illustrating an example of operation mode settings stored in the nonvolatile memory 204. The operation mode settings include a print speed, limit threshold for the total toner application amount, and drum rotational speed reduction control. A plurality of operation mode settings corresponding to the operation modes is stored in the nonvolatile memory 204. For example, when the print operation mode has been changed to the high-chroma mode, the operation mode control unit 302 obtains operation mode settings for the high-chroma mode from the nonvolatile memory 204. The operation mode control unit 302 holds in the RAM 203 a print speed "15", a limit threshold for the total toner application amount "200", and a drum rotational speed reduction control "ON" included in the obtained operation mode settings. A concrete way of using operation mode settings will be described later. In the following description, printing performed when the print operation mode is the normal mode is referred to as "normal printing", and printing performed when the print operation mode is the high-chroma mode is referred to as "high-chroma printing".

Referring again to FIG. 3, the image processing unit 303 includes a color conversion unit 310 that carries out color conversion, a tone correction unit 311 that carries out a tone correction, and a halftoning unit 312 that carries out halftoning. The image processing unit 303 subjects input image data to image processing such as the color conversion, the tone correction, and the halftoning. As a result, image data input to the image processing unit 303 is converted into print data that can be output (printed on a recording material) by the image output unit 304. Namely, the image processing unit 303 generates print data from input image data. At this time, when the input image data has high density, and the total toner application amount is equal to or greater than a limit threshold for the total toner application amount held in the RAM 203, the total toner application amount is adjusted to the limit threshold for the total toner application amount. The reason for this is that there is an upper limit to the total toner application amount with which the printer engine 111 is able to properly perform printing and fixing at normal speed. In the present embodiment, when the print operation mode is the "normal mode", an exemplary value of the limit threshold for the total toner application amount is "150" as illustrated in FIG. 5. On the other hand, in high-chroma printing, the print speed is reduced so that printing and fixing can be performed properly even when the total toner application amount is made larger than in normal printing. Accordingly, in the present embodiment, when the print operation mode is the "high-chroma mode", an exemplary value of the limit threshold for the total toner application amount is "200" as illustrated in FIG. 5. Here, information about the total toner application amount that has been adjusted is held as a part of print data in the RAM 203 until printing is completed.

The image output unit 304 obtains print data from the image processing unit 303 and sends the print data as a video signal to the printer engine 111 via the engine I/F 207. As a result, the CPU 201 controls the printer engine 111 to perform image formation on a recording material based on the print data generated by the image processing unit 303. The printer engine 111 prints images on the recording material by carrying out an exposure process, a development process, a transfer process, and a fixing process. The image output unit 304 also notifies the printer engine 111 of a print speed included in the operation mode settings held in the RAM 203 via the engine I/F 207. This enables the print engine 111 to perform printing at a print speed suitable for a print operation mode designated by a user. It should be noted that although in the above description of the present embodiment, the printer engine 111 is notified of a print speed, this is not limitative. For example, the image output unit 304 may notify the printer engine 111 of a print operation mode designated by a user, not a print speed, and the printer engine 111 may refer to various pieces of print speed information held in advance and then determine a print speed for a print operation mode designated by the user from the pieces print speed information.

The development control unit 305 determines rotational speeds of the developing rollers 3 and the photosensitive drums 1 based on a value of drum rotational speed reduction control included in the operation mode settings held in the RAM 203. The development control unit 305 also adjusts power of laser beams based on a specified print operation mode. Thus, for example, in high-chroma printing, a larger amount of toner than in normal printing is supplied from the developing rollers 3 to the photosensitive drums 1 to improve the chroma of toner images based on a piece of image data and a printed image. Moreover, in high-chroma printing, for example, the rotational speed of the photosensitive drums 1 is made lower than in normal printing without changing the rotational speed of the developing rollers 3. Specifically, the rotational speed of the photosensitive drums 1 is decreased to one-third of the rotational speed in normal printing. The reason for this is that a speed at which a sheet passes through the fixing device 17 that fuses toner with heat and presses it onto the sheet to fix the toner, depends on a fixing speed at which the fixing device 17 can reliably fix toner onto a sheet, and the rotational speed of the photosensitive drums 1 depends on this fixing speed. As described above, by increasing the circumferential speed ratio of the photosensitive drums 1 to the developing rollers 3, a larger amount of toner is transferred to the photosensitive drums 1 than in normal printing. In most cases, however, in order to maximize the print speed, the rotational speed of the photosensitive drums 1 and the rotational speed of the developing rollers 3 are set to respective maximum values. Accordingly, in the present embodiment, when the drum rotational speed reduction control is "ON", the circumferential speed ratio is adjusted by decreasing the rotational speed of the photosensitive drums 1 without changing the rotational speed of the developing rollers 3.

Although in the present embodiment, the rotational speed of the photosensitive drums 1 is adjusted based on the drum rotational speed reduction control, the rotational speed of the photosensitive drums 1 may be controlled based on the print operation mode designated by the user. However, whether or not it is possible to change the circumferential speed ratio of the photosensitive drums 1 to the developing rollers 3 depends on a mechanical arrangement, and hence there may be a printer engine for which it is impossible to change the circumferential speed ratio of the photosensitive drums 1 to the developing rollers 3. Namely, there may be a printer engine in which the drum rotational speed reduction control is "OFF" although the print operation mode designated by the user is the "high-chroma mode". For this reason, it is preferred that as with the drum rotational speed reduction control in the present embodiment, the rotational speed of the photosensitive drums 1 is controlled based on information that corresponds to the print operation mode but not the printing operation mode itself.

The device status management unit 306 receives information about a status of the SFP 100 from the printer engine 111 via the engine I/F 207 and manages a device status. For example, in a case where the SFP 100 is continuously printing multiple pages, the device status management unit 306 manages the progress of printing such as to which page printing has been completed. Then, at a predetermined moment, for example, when feeding of recording materials has been started or sheet ejection has been completed, the device status management unit 306 notifies the counter management unit 308 that sheet feeding was started or sheet ejection was completed. When the printer engine 111 notifies the device status management unit 306 that an error requiring a user operation to fix the error such as a paper-out condition occurred during printing, the device status management unit 306 sets the device status to, for example, "Out of paper". The CPU 201 detects this change in the device status and controls the display unit 205 to display "Error that prompts a user to load paper due to a paper-out condition". When the printer engine 111 notifies the device status management unit 306 that an abnormality fatal to perform printing such as a breakdown of the fixing device 17 occurred, the device status management unit 306 sets the device status to a "Service error" status and also sets an error code according to a failed part. The error code may be in any format, and it is desirable that the failed part or the like be uniquely identified. The CPU 201 detects this change in the device status and controls the display unit 205 to indicate that "Service error has occurred" and "Error code". Furthermore, the device status management unit 306 sends information about the service error to the management server, not illustrated, via the network I/F 208 when the service error has occurred.

FIG. 6 is a view illustrating an example of information sent as information about service errors to the management server. The device status management unit 306 sends to the management server information about the service error including a date on which a service error occurred, an error code indicating the service error, and print counters. The print counter of which counter ID 802 in FIG. 8 is #7001 indicates the total number of pages printed by the SFP 100, where the counter ID 802 is managed by the counter management unit 308 and will be described later. In a case where the service error relates to the fixing device 17 or the transfer body, in particular, the secondary transfer roller 11, the device status management unit 306 sends a high-chroma print counter for a fixing/transfer unit as well as the information described above to the management server. As for the high-chroma print counter for the fixing/transfer unit, its counter ID 802 in FIG. 8, which will be described later, managed by the counter management unit 308 is #7002.

For example, in the exemplary table in FIG. 6, "100-0000" is an error code indicating a breakdown of the fixing device 17, and "200-0000" is an error code indicating a breakdown of a transfer body. When such a service error has occurred, the device status management unit 306 sends a date on which the service error occurred, the error code indicating the service error, the print counter, and the high-chroma print counter for the fixing/transfer unit to the management server. On the other hand, "300-0000" is an error code indicating a breakdown of a sheet feeding roller. When this service error has occurred, the device status management unit 306 sends a date on which the service error occurred, the error code indicating the service error, and the print counter to the management server. By sending information about a service error in this manner, the device status management unit 306 notifies the management server about how far high-chroma printing was performed when a failure occurred so that a serviceperson, an engineer, or the like can analyze whether or not the failure is related to high-chroma printing.

The cartridge status management unit 307 receives information about statuses of the process stations 5 from the printer engine 111 via the engine I/F 207 and manages cartridge statuses. For example, the cartridge status management unit 307 receives and manages a page counter indicating how many pages have been printed by the process stations 5, information about cartridge remaining levels, and so forth from the printer engine 111. When detecting the remaining levels of the process stations 5, for example, toner remaining amount sensors, which are not illustrated and capable of detecting toner remaining amounts W %, X %, Y %, and Z % (0%) are used. The amounts of toner remaining in the process stations 5 are calculated based on information about toner remaining amounts detected by toner remaining amount sensors, not illustrated, and information on video counts that add output data every time the printer engine 111 performs printing. Specifically, changes in the toner remaining amounts are determined by detecting the toner remaining amounts W %, X %, Y %, and Z % by the toner remaining amount sensors, and interpolating the detected values by using the video counts.

When the printer engine 111 notifies the cartridge status management unit 307 of a status of which a user should be notified such as the toner remaining amount becoming 0%, the cartridge status management unit 307 sets the cartridge status indicating the status of the corresponding process station 5 to, for example, "Cartridge reaching the end of life". The CPU 201 detects this change in the cartridge status and controls the display unit 205 to display "Error prompting a user to replace a cartridge because the cartridge has reached the end of life".

The cartridge status management unit 307 also stores historic information about the process stations 5 attached to the SFP 100 as well as information about usage conditions of the process stations 5 in the nonvolatile memory 204. It should be noted that in the following description, the historical information about each process station 5 is referred to as a cartridge log. FIG. 7 illustrates an example of the cartridge logs. A plurality of cartridge logs for the respective process stations 5 is stored in the nonvolatile memory 204. Each cartridge log includes a serial number 701, a cartridge remaining level when attached 702, a cartridge remaining level when used last 703, a print counter 704, a high-chroma print counter for the developing device 705, and a high-chroma print counter for toner 706. It should be noted that the cartridge log may further include, for example, information about the date and time of cartridge attachment in addition to the above information.

Serial Nos. 701 are unique IDs assigned to the respective process stations 5. The cartridge remaining level when attached 702 is the cartridge remaining level when the corresponding process stations 5 is attached for the first time. Here, in the present embodiment, each of the process stations 5 is a cartridge with a configuration in which the toner/developing device is separately provided from the photosensitive drum 1. The cartridge remaining level is calculated with consideration given to both the remaining amount of toner and wearing-down of the developing device. It should be noted that if, for example, one of the process stations 5 is configured to include the corresponding photosensitive drum 1, the cartridge remaining level of this process station 5 is calculated with additional consideration given to wearing-down of the photosensitive drum 1.

The cartridge remaining level when used last 703 is the cartridge remaining level that is updated when the corresponding process station 5 is last used. The print counter 704 is the number of pages printed using the corresponding process station 5 and counted up in both of normal printing and high-chroma printing. The counter management unit 308 counts up the print counter 704. The counter management unit 308 notifies the cartridge status management unit 307 of a value obtained by counting-up and updates the print counter 704. The high-chroma print counter for the developing device 705 is counted up by the counter management unit 308 when an operation that affects the lifespan of the developing rollers 3 has been performed. Detailed description thereof will be given later. The high-chroma print counter for toner 706 is counted up by the counter management unit 308 when an operation that affects the lifespan of toner has been performed. Details thereof will be described later. Based on such cartridge logs, the interrelationship between the lifespan of the process stations 5 and high-chroma printing is analyzed. For example, it is clear that 2,000 pages were printed using a cartridge of which the serial No. 701 is #2345678901 (hereafter referred to as the cartridge A) while its cartridge remaining level decreased from 100% to 0%. On the other hand, it can be seen that only 1,500 pages were printed using a cartridge of which the serial No. 701 is #5678901234 (hereafter referred to as the cartridge B) while its cartridge remaining level decreased from 100% to 0%. With these pieces of information alone, it is impossible to identify the reason why the cartridge B has a shorter lifespan than that of the cartridge A. Here, by referring to the high-chroma print counter for the developing device 705 and the high-chroma print counter for toner 706, it can be seen that high-chroma printing using the cartridge B was performed more frequently than high-chroma printing using the cartridge A. As a result, it turns out that the cartridge B has a shorter lifespan because the developing device wore to a higher degree, and a larger amount of toner was used than normal. By providing each cartridge with such a counter indicating that high-chroma printing was performed, the reason for the decrease in the lifespans of the process stations 5 can be analyzed. The cartridge logs can be printed as reports by a user or serviceperson. Cartridge logs can also be recorded for the photosensitive drums 1 which are regarded as drum cartridges. In this case, the high-chroma print counter for the developing device 705 and the high-chroma print counter for toner 706 are not required for drum cartridge logs. A counter that is equivalent to a high-chroma counter for the drum in a counter table 800 in FIG. 8, to be described later, is used instead. Moreover, the drum cartridge logs differ from the cartridge logs for the process stations 5 in that the cartridge remaining levels are based on the remaining levels of the respective photosensitive drums 1 alone.

The cartridge status management unit 307 sends alarm information to the management server via the network I/F 208 when a specific event relating to the process stations 5 has occurred. Examples of the specific event include the cartridge remaining level decreasing to a threshold value set on the operation unit 206, the cartridge remaining level becoming 0%, and replacement of one of the process stations 5. The alarm information includes, for example, the date and time of occurrence, an alarm code, and a cartridge log. The alarm code may be in any format, and it is preferable that the alarm code can uniquely identify an event that has occurred. In the present embodiment, the high-chroma print counter for the developing device 705 and the high-chroma print counter for toner 706 are sent together as the alarm information. As a result, the management server can be notified about an extent to which high-chroma printing was performed particularly when an event indicating that one of the process stations 5 has reached the end of its life occurred. Therefore, even a person who is not close to the SFP 100 such as a serviceperson or engineer can analyze whether or not the lifespan of a cartridge is related to high-chroma printing. It should be noted that if cartridge logs on the photosensitive drums 1 are left, an alarm code is preferably defined such that an alarm for the toner/developing device cartridge and an alarm for the photosensitive drums 1 can be distinguished from each other.

The counter management unit 308 manages various types of counters used when the SFP 100 performed printing. FIG. 8 is a view illustrating an example of the counter table 800 that is managed by the counter management unit 308. It should be noted that the counter table 800 is just an example, and the counter table 800 may include information other than the information in FIG. 8.

The counter table 800 includes counter names 801, counter IDs 802, counter attributes 803, and count-up conditions 804. The counter names 801 are names of the counters. The counter IDs 802 are IDs assigned to the respective counters. The counter attributes 803 represent attributes of the counters and indicate which units are related to the counters. For example, the counter attribute 803 of a total counter is "Main body", and hence it is a counter related to the whole of the SFP 100. For this reason, when the SFP 100 starts to be used, the total counter becomes 0, and after that, it continues to be counted up until the SFP 100 stops being used. Basically, the total counter is a counter that is never cleared or reset. Counters whose counter attribute 803 is "Drum cartridge" are counters related to a drum cartridge including the corresponding photosensitive drum 1. These counters become zero when a new drum cartridge is attached to the SFP 100, and for example, a print counter for the drum cartridge continues to be counted up until the drum cartridge stops being used. Counter whose counter attribute 803 is "Drum cartridge" are each characterized by running for an individual toner cartridge. Counters whose counter attribute 803 is "Toner cartridge" are counters related to toner cartridges such as the process stations 5 and each characterized by running for an individual toner cartridge. The count-up conditions 804 are the timing of count-up and count-up events and vary with counters.

Figure 9:
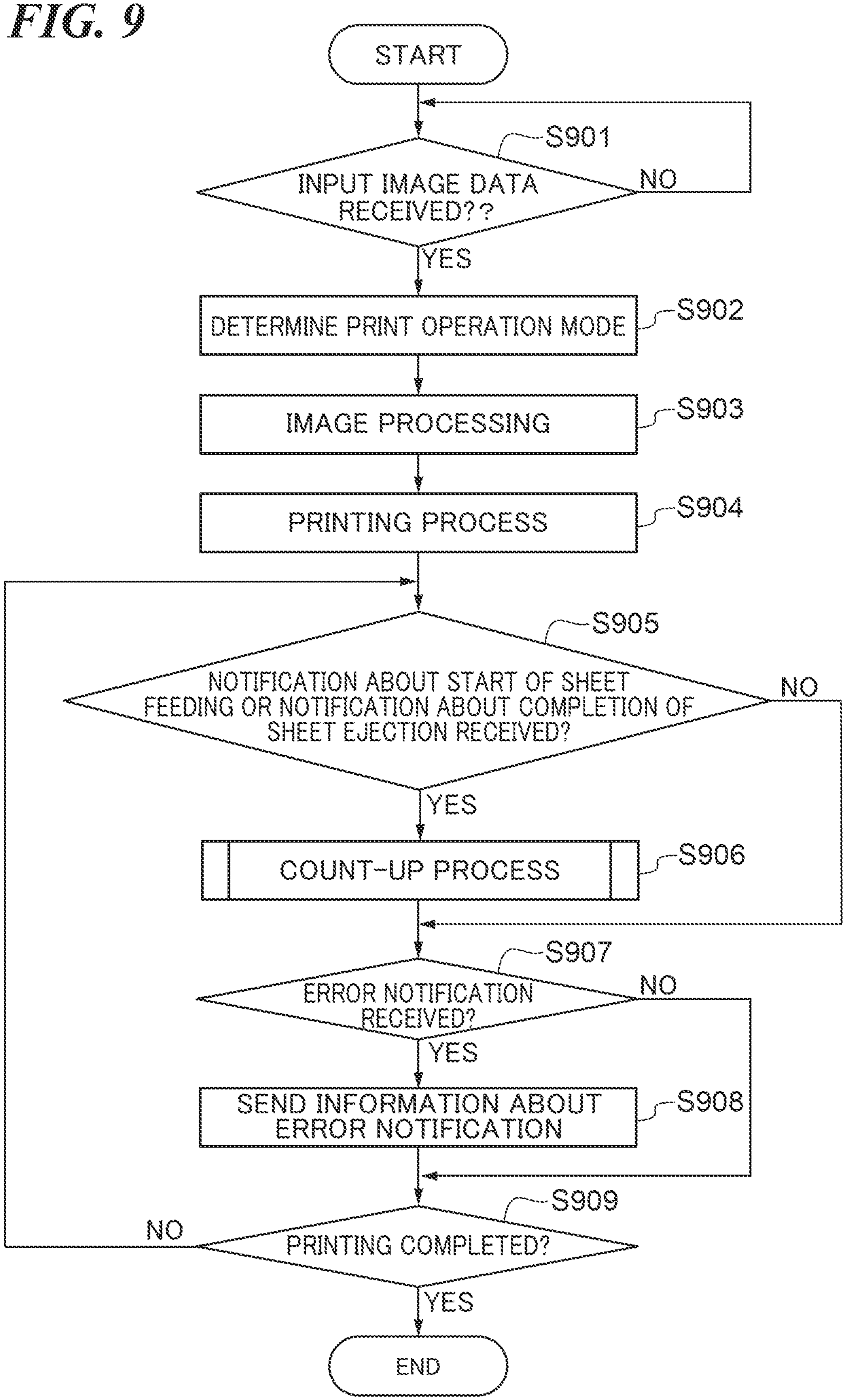
FIG. 9 is a flowchart illustrating the procedure of a printing control process that is carried out by the SFP in FIG. 1.

FIG. 9 is a flowchart illustrating the procedure of a printing control process that is carried out by the SFP 100 in FIG. 1. The process in FIG. 9 is implemented by the CPU 201 loading a program stored in the ROM 202 into the RAM 203 and executing the same.

Referring to FIG. 9, the CPU 201 stands by until the image input unit 301 receives input image data. The image data input here is, for example, a bitmap image. When the image input unit 301 receives input image data (YES in step S901), the CPU 201 holds the image data in the RAM 203 or the nonvolatile memory 204. Then, the CPU 201 causes the operation mode control unit 302 to determine the print operation mode (step S902). Specifically, the CPU 201 determines whether the print operation mode is the normal mode or the high-chroma mode. In the step S902, the determination whether the print operation mode is the normal mode or the high chroma mode is based on, for example, a setting on the operation mode selection screen 401. It should be noted that in the step S902, the determination whether the print operation mode is the normal mode or the high-chroma mode should not always be made based on a setting on the operation mode selection screen 401 but may be determined based on, for example, a print setting included in the image data held in the RAM 203 or the nonvolatile memory 204.

Then, the CPU 201 causes the image processing unit 303 to perform image processing such as color conversion, tone correction, and halftoning on the held image data (step S903). As a result, print data is generated. After that, the CPU 201 carries out a printing process based on the print data (step S904). Specifically, the CPU 201 causes the image output unit 304 to send the print data as a video signal to the printer engine 111. The printer engine 111 prints an image on a recording material by carrying out the following processes: exposure, development, transfer, and fixing. When sending the print data, the CPU 201 also sends operation mode information from the image output unit 304 to the development control unit 305. The development control unit 305 that has received the operation mode information carries out a developing process according to the print operation mode. Specifically, in high-chroma printing, the development control unit 305 raises laser beam power and makes the rotational speed of the developing rollers 3 equal to the rotational speed in normal printing. The development control unit 305 also controls the rotation of the photosensitive drums 1 such that they rotate in the same direction as the developing rollers 3 and rotate at lower speed than in normal printing. Then, the CPU 201 causes the device status management unit 306 to determine whether or not a notification that sheet feeding of one page was started or a notification that sheet ejection of one page was completed has been received from the printer engine 111 (step S905).

As a result of the determination in the step S905, when neither the notification that sheet feeding of one page was started nor the notification that sheet discharging of one page was completed has been received, the printing control process proceeds to step S907. As a result of the determination in the step S905, when the notification that sheet feeding of one page was started or the notification that sheet ejection of one page was completed has been received, the CPU 201 notifies the counter management unit 308 that an event corresponding to the received notification has occurred, and more specifically, sheet feeding was started or sheet ejection was completed. Then, the CPU 201 causes the counter management unit 308 to carry out a count-up process in FIG. 10, which will be described later (step S906). After that, the CPU 201 determines whether or not an error notification indicating occurrence of an error that interferes with continuation of printing such as a paper-out condition, a component failure, or a toner life end has been received (step S907).

As a result of the determination in the step S907, when the error notification has not been received, the printing control process proceeds to step S909. As a result of the determination in the step S907, when the error notification has been received, the CPU 201 sends information about the received error notification to the management server (step S908). For example, when an error notification indicating occurrence of a serious error such as a component failure is received in the step S907, the CPU 201 sends information about the error to the management server via the network I/F 208. At this time, the CPU 201 also sends counter information about the error to the management server. When an error notification indicating that delivery of a next cartridge is needed because the toner remaining amount is small, or an error notification indicating that toner has run out was received in the step S907, the CPU 201 sends alarm information about toner to the management server via the network I/F 208. At this time, the CPU 201 also sends counter information relating to the alarm information about toner to the management server. In this manner, a notification of a component abnormality can be provided with proper timing, and this is useful in, for example, delivery of a replacement component. Then, the CPU 201 determines whether or not printing has been completed (step S909). In the step S909, based on whether or not a printing completion notification indicating that all printing based on print data had been completed was received from the printer engine 111 via the engine I/F 207, the CPU 201 determines whether or not printing has been completed.

As a result of the determination in the step S909, when any of printing based on the print data has not been completed, the printing control process returns to the step S905. As a result of the determination in the step S909, when all of printing based on the print data has been completed, the printing control process is ended.

Figure 10:
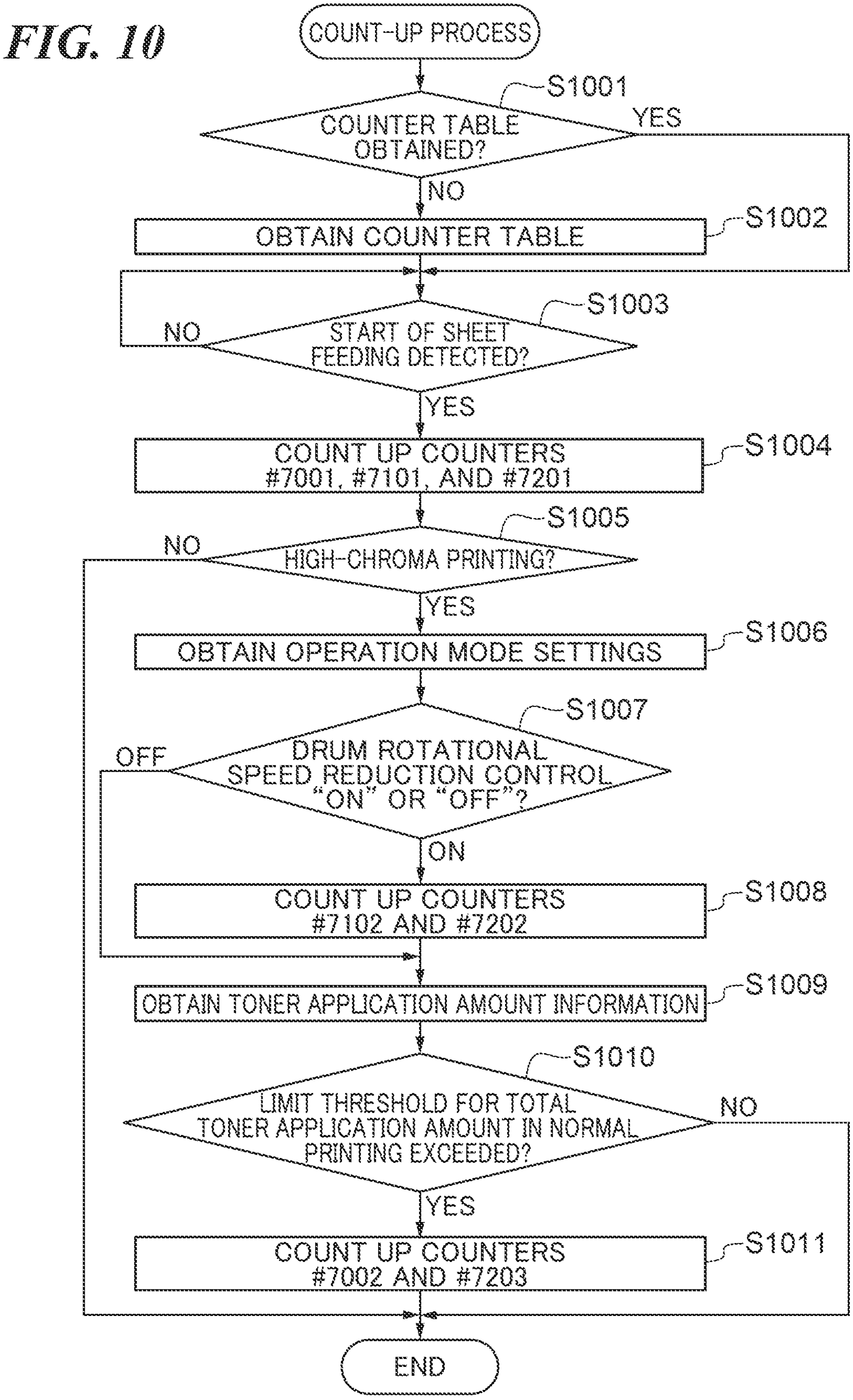
FIG. 10 is a flowchart illustrating the procedure of a count-up process in step S906 in FIG. 9.

FIG. 10 is a flowchart illustrating the procedure of the count-up process in the step S906 in FIG. 9. The count-up process in FIG. 10 is carried out when printing of one page is performed.

Referring to FIG. 10, the CPU 201 determines whether or not the counter table 800 has already been obtained from the nonvolatile memory 204 (step S1001). As a result of the determination in the step S1001, when the counter table 800 has already been obtained, the count-up process proceeds to S1003. As a result of the determination in the step S1001, when the counter table 800 has not yet been obtained, the CPU 201 causes the counter management unit 308 to obtain the counter table 800 (step S1002). It should be noted that although in the present embodiment, the counter table 800 is obtained at the start of printing, the counter table 800 may be obtained when, for example, the power to the SFP 100 is turned on.

Then, the CPU 201 stands by until the device status management unit 306 detects starting of sheet feeding. When the device status management unit 306 detects starting of sheet feeding (YES in the step S1003), the CPU 201 notifies the counter management unit 308 that sheet feeding has been started. Although in the present embodiment, the count-up process is carried out at the start of sheet feeding, the count-up process may be carried out at the completion of printing or with other moments. The count-up process may be carried out at the start of sheet feeding, the completion of printing, or the like in accordance with the operation timing of a targeted component. In the present embodiment, after sheet feeding is started, there is a possibility that each component has worn out even if sheet feeding is stopped due to a sheet jam or the like at some point, and hence at the start of sheet feeding, the count-up process is carried out.

Then, the CPU 201 causes the counter management unit 308 to count up counters with counter IDs 802 of #7001, #7101, and #7201 (step S1004). The counters with the counter IDs 802 of #7001, #7101, and #7201 are counters that satisfy count-up conditions "at the start of sheet feeding in normal printing or at the start of sheet feeding in high-chroma printing". For example, when the counter with the counter ID 802 of #7001 has been counted up, the counter management unit 308 notifies the cartridge status management unit 307 of the counter #7001 that has been counted up.

The cartridge status management unit 307 updates the print counter 704 based on the counter of which it was notified.

The CPU 201 then determines whether or not printing that is being performed is high-chroma printing (step S1005). As a result of the determination in the step S1005, when printing that is being performed is not high-chroma printing, that is, when printing that is being performed is normal printing, there is no other counter that needs to be counted up, and hence the count-up process is ended.

As a result of the determination in the step S1005, when printing being performed is high-chroma printing, the CPU 201 obtains an operation mode setting corresponding to a set print operation mode (step S1006). The CPU 201 then determines whether a value of drum rotational speed reduction control included in the obtained operation mode setting is "ON" or "OFF" (step S1007).

As a result of the determination in the step S1007, when the value of drum rotational speed reduction control included in the obtained operation mode setting is "OFF", the count-up process proceeds to step S1009. As a result of the determination in the step S1007, when the value of drum rotational speed reduction control included in the obtained operation mode setting is "ON", the CPU 201 causes the counter management unit 308 to count up counters with counter IDs 802 of #7102 and #7202 (step S1008). The counters with the counter IDs 802 of #7102 and #7202 are counters that satisfy count-up conditions "At the start of sheet feeding in high-chroma printing and when drum rotational speed reduction control has been performed". For example, when the counter with the counter ID 802 of #7202 has been counted up, the counter management unit 308 notifies the cartridge status management unit 307 of the counter #7202 that has been counted up. The cartridge status management unit 307 updates the high-chroma printing print counter for the developing device 705 based on the counter of which it was notified.

Then, the CPU 201 causes the counter management unit 308 to obtain information about the toner application amount included in print data (step S1009). The information about the toner application amount is the toner application amount 1103 after the toner application amount is limited as will be described later. When the value of drum rotational speed reduction control included in the obtained operation mode setting is "ON", the amounts of toner actually applied onto the respective photosensitive drums 1 (corresponding to a final toner application amount 1104, which will be described later) is increased by reducing the rotational speed of the photosensitive drums 1. In the present embodiment, the toner application amount is calculated on the assumption that, when drum rotational speed reduction control has been performed, the toner application amount becomes twice as large as the toner application amount 1103 after the toner application amount is limited. The CPU 201 then determines whether or not the final toner application amount is greater than the limit threshold for the total toner application amount in normal printing (step S1010).

As a result of the determination in the step S1010, when the final toner application amount is not greater than the limit threshold for the total toner application amount in normal printing, the count-up process is ended. As a result of the determination in the step S1010, when the final toner application amount is greater than the limit threshold for the total toner application amount in normal printing, the CPU 201 causes the counter management unit 308 to count up counters with counter IDs 802 of #7002 and #7203 (step S1011). The counters with the counter IDs 802 of #7002 and #7203 are counters that satisfy count-up conditions "At the start of sheet feeding in high-chroma printing and when the total toner application amount has become larger than 150%". Here, the reason why the comparison with the limit threshold for the total toner application amount in normal printing is performed is that the counters should be counted up when an amount of toner that is never applied in normal printing is applied due to high-chroma printing. Risks of sheet twisting in the fixing unit and soiling caused by toner dispersion in the transfer unit increase with the toner application amount, and therefore, in the present embodiment, when the total toner application amount is large, the counter #7002 is counted up. Moreover, the lifespan of a toner cartridge decreases as the toner application amount increases, and hence in the present embodiment, when the total toner application amount is large, the counter #7203 is counted up. After that, the count-up process is ended.

According to the embodiment described above, the number of times of image formation performed in the normal mode is not counted up, but the number of images formation performed in the high-chroma mode is counted up. In other words, a specific count function for counting the number of times of image formation performed in the high-chroma mode without counting the number of times of image formation performed in the normal mode, is performed. As a result, a load imposed on the SFP 100 by performing high-chroma printing can be properly grasped.

In the embodiment described above, the process stations 5, in which a predetermined amount of toner used to image formation is stored, are detachable from the SFP 100. As a result, a load placed on the SFP 100 by performing high-chroma printing can be properly grasped in the SFP 100 from which the process stations 5 are detachable.

Moreover, both the number of times of image formation performed in the normal mode and the number of times of image formation performed in the high-chroma mode are counted. As a result, a load placed on the SFP 100 by performing printing operations including normal printing can be properly grasped.

FIG. 11 is a view illustrating an example of the results of count-up by the count-up process in FIG. 10. In FIG. 11, print data 1101 is exemplary print data. A print operation mode 1102 is a print operation mode set for the print data 1101. The total toner application amount after amount limitation 1103 is a total toner application amount after limited with the limit threshold for the total toner application amount. When the total toner application amount exceeds 150% in the normal mode and when the total toner application amount exceeds 200% in the high-chroma mode, the total toner application amount is limited to values not more than them. For example, for a YMCK 50% image, the total toner application amount is 200%, but as a result of limitation with the limit threshold for the total toner application amount, the toner application amount per color is limited to 37% (all digits to the right of the decimal point are discarded).

The final toner application amount 1104 is an amount obtained by summing the toner application amounts in all colors in printing. In the high-chroma mode, by decreasing the rotational speed of the photosensitive drums 1, the toner application amount becomes twice as large as the toner application amount after the amount limitation 1103. As a result, count-up results 1105 for the counters #7002 and #7203 and count-up results 1106 for the counters #7102 and #7202 are those illustrated in FIG. 11. In FIG. 11, the symbol "O" indicates that count-up of the counters has been performed, and the symbol "X" indicates that count-up of the counters has not been performed. The counters #7002 and

#7203 are always counted up during high-chroma printing, and the total toner application amount is included in count-up conditions. On the other hand, the counters #7102 and #7202 are not counted up for print data with a small total toner application amount such as YMCK 50%. With this arrangement, the degree of degradation of each component caused by high-chroma printing can be accurately analyzed.

Although the present invention has been described by way of the embodiment, the present invention should not be limited to the embodiment described above. For example, a user may be notified of risks of high-chroma printing. Specifically, when a user changes the setting from "OFF" to "ON" on the operation mode selection screen 401 in FIG. 4, a message screen 1201 in FIG. 12 is displayed on the display unit 205 for calling user's attention.

Figure 12:
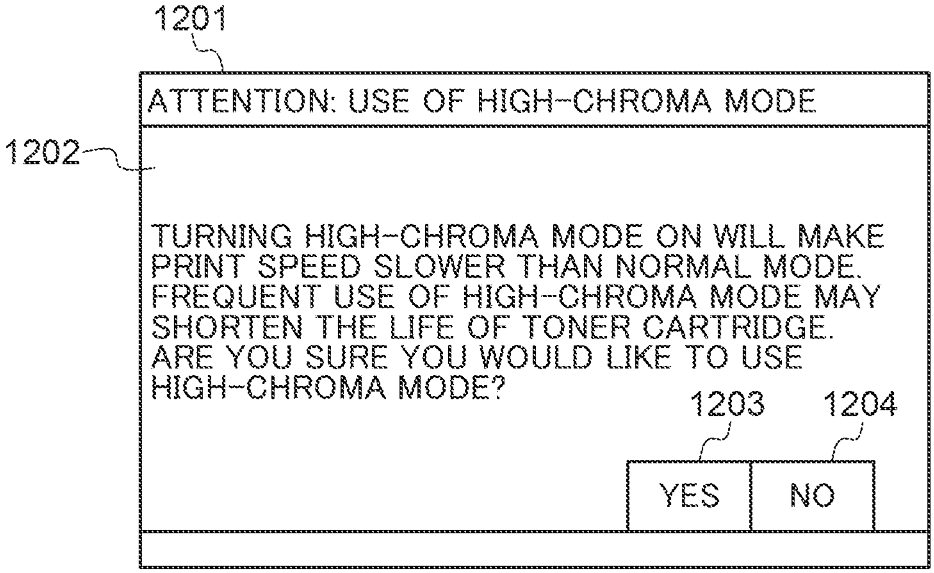
FIG. 12 a view illustrating an example of a message screen that is displayed on the display unit in FIG. 2.

FIG. 12 a view illustrating an example of the message screen 1201 that is displayed on the display unit 205 in FIG. 2 for calling user's attention. The message screen 1201 includes a message display area 1202, a "YES" button 1203, and a "NO" button 1204. The message display area 1202 indicates a message calling attention to use of the high-chroma mode. It should be noted that the message does not mention components such as the fixing device 17 and the transfer unit which users are usually less aware of, but mention only a toner cartridge which users are familiar with as a consumable part. However, a message that mentions all of components affecting the lifespan may be indicated in the message display area 1202. When the "YES" button 1203 is selected, the operation mode control unit 302 is notified that the high-chroma mode is selected, and the operation mode control unit 302 saves "High-chroma mode" as the print operation mode in the nonvolatile memory 204. When the "NO" button 1204 is selected, the display screen on the display unit 205 goes back from the message screen 1201 to the previous operation mode selection screen 401.

Displaying the message screen 1201 on the display unit 205 notifies a user who is now going to perform high-chroma printing of the risks involved in performing high-chroma printing.

In the embodiment described above, when to provide notifications about the automatic delivery timing of a consumable part and the lifespan of a component can be predicted by making use of a high-chroma print counter for each component. As described above, during high-chroma printing, by reducing the rotational speed of the photosensitive drums 1, the toner application amount becomes twice as large as the toner application amount after amount limitation 1103. With consideration given to this, the automatic delivery timing of a toner cartridge is predicted based on the assumption that toner twice the amount in normal printing is consumed when high-chroma printing is performed. The predicting process is carried out by the cartridge status management unit 307.

For example, assume that a toner cartridge capable of printing up to approximately 1,000 sheets in normal printing is configured such that automatic delivery is done when the residual amount of toner becomes equal to 20%. However, when the SFP 100 determines that a certain user tends to frequently use high-chroma printing, control is performed to send an alarm for doing automatic delivery when the residual amount of toner becomes equal to 40%, which is twice larger than 20%, to the management server. Here, whether or not a certain user frequently uses high-chroma printing is determined based on, for example, the print counter 704 and the high-chroma print counter for toner 706. In the example illustrated in FIG. 7, when the value of the high-chroma print counter for toner 706 is not less than half the value of the print counter 704, the SFP 100 determines that the user frequently uses high-chroma printing. Alternatively, when the value of the high-chroma print counter for toner 706 become greater than 200 (equivalent to 20% for a toner cartridge capable of printing up to 1,000 sheets in normal printing), the SFP 100 determines that the user frequently uses high-chroma printing.

Moreover, in the embodiment described above, in the step S1011, an accumulated value of the toner application amounts obtained in the step S1009 may be recorded. Thus, how much more toner has been actually used than in normal printing can be analyzed, and as a result, the proper timing of automatic delivery can be predicted using the result of the analysis. Here, for example, when the value of the drum rotational speed reduction control is "ON", a value twice the toner application amount obtained in the step S1009 (a value equivalent to the final toner application amount 1104) is recorded as an accumulated value. For example, when the accumulated value is 50,000(%) and the value of the high-chroma print counter for toner 706 is 250, it turns out that high-chroma printing was performed with an average total toner application amount of 200%. When normal printing is performed, the total toner application amount is 150% at the maximum, and hence it can be said that toner approximately 1.3 times the amount in normal printing is consumed in high-chroma printing. Accordingly, 250 sheets in high-chroma printing can be converted into 325 sheets in normal printing, and hence automatic delivery is advanced by 75 sheets (equivalent to 7.5% for a toner cartridge capable of printing up to 1,000 sheets in normal printing). Namely, an alarm for doing automatic delivery when the residual amount of toner becomes equal to 27.5% is sent. The accumulated value of the toner application amounts should be recorded as a piece of information in a cartridge log and sent to the management server when an alarm is issued. This is useful in, for example, providing notification of a component abnormality and delivering a component with proper timings.

Although in the embodiment described above, the process stations each has a configuration in which the toner/developing device and the photosensitive drum are provided as separate units, the process stations should not always have this configuration. For example, the process station may have a configuration in which toner, developing device, and photosensitive drum are provided as an integral unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-042472 filed on Mar. 16, 2021 which is hereby incorporated by reference herein in its entirety.

What is claimed is:

1. An image forming apparatus comprising:

a printer engine that causes a heating rotary body to support and convey a sheet with a toner image formed thereon and performs an image formation on the sheet;

a first counter used for counting up when one page is printed with one of first chroma and second chroma higher than the first chroma;

a second counter used for counting up when one page is printed with the second chroma;

at least one memory; and at least one processor that executes instructions stored in the at least one memory to:

control the printer engine to perform, during a printing process, the image formation on sheets in a first mode in which a toner image based on a piece of image data is formed with a first amount of toner, or a second mode in which a toner image based on the piece of image data is formed with a second amount of toner larger than the first amount of toner;

control the first counter to count up during a period corresponding to the printing process;

control the second counter not to count up during the period corresponding to the printing process, in a case where the printer engine is controlled in the first mode; and control the second counter to count up during the period corresponding to the printing process, in a case where the printer engine is controlled in the second mode.

2. The image forming apparatus according to claim 1, wherein the printer engine includes a transfer body that transfers a toner image based on a piece of image data onto a sheet.

3. The image forming apparatus according to claim 1, wherein a cartridge that stores a predetermined amount of toner used for the image formation is detachable from the image forming apparatus.

4. The image forming apparatus according to claim 3, wherein the cartridge includes the first counter and the second counter.

5. The image forming apparatus according to claim 1, wherein the period corresponding to the printing process starts at a start of printing one page of a print data, and wherein the at least one processor further executes the instructions stored in the at least one memory to:

count up the first counter when feeding a sheet for executing the printing process; and count up the second counter when executing the printing process, in a case where toner application amount included in the print data is greater than a threshold.

6. The image forming apparatus according to claim 1, wherein the period corresponding to the printing process starts at a completion of printing one page of a print data, and wherein the at least one processor further executes the instructions stored in the at least one memory to:

count up the first counter at the completion; and count up the second counter at the completion in a case where toner application amount included in the print data is greater than a threshold.

7. The image forming apparatus according to claim 1, further comprising a third counter, wherein the at least one processor further executes the instructions stored in the at least one memory to:

control the third counter not to count up during the period corresponding to the printing process, in a case where there is no setting for rotational speed reduction control for the heating rotary body; and control the third counter to count up during the period corresponding to the printing process, in a case where there is a setting for rotational speed reduction control for the heating rotary body.

8. The image forming apparatus according to claim 1, wherein the at least one processor further executes the instructions stored in the at least one memory to:

set each page in the print data whether or not to perform high-chroma printing; and control the printer engine in the second mode when a page in the print data is set to perform the high-chroma printing.

9. The image forming apparatus according to claim 1, wherein the heating rotary body is a cartridge having the first counter and the second counter.

10. The image forming apparatus according to claim 1, further comprising an interface to communicate with a server, wherein the at least one processor further executes the instructions stored in the at least one memory to send an alarm to the server when at least one of the first counter or the second counter becomes greater than a predetermined value.

11. A control method for an image forming apparatus including a printer engine that causes a heating rotary body to support and convey a sheet with a toner image formed thereon and performs an image formation on the sheet, a first counter used for counting up when one page is printed with one of first chroma and second chroma higher than the first chroma, and a second counter used for counting up when one page is printed with the second chroma, the control method comprising:

controlling the printer engine to perform, during a printing process, the image formation on sheets in a first mode in which a toner image based on a piece of image data is formed with a first amount of toner, or a second mode in which a toner image based on the piece of image data is formed with a second amount of toner larger than the first amount of toner; controlling the first counter to count up during a period corresponding to the printing process;

controlling the second counter not to count up during the period corresponding to the printing process, in a case where the printer engine is controlled in the first mode; and controlling the second counter to count up during the period corresponding to the printing process, in a case where the printer engine is controlled in the second mode.

12. The control method according to claim 11, wherein the printer engine includes a transfer body that transfers a toner image based on a piece of image data onto a sheet.

13. The control method according to claim 11, wherein a cartridge that stores a predetermined amount of toner used for the image formation is detachable from the image forming apparatus.

14. The control method according to claim 13, wherein the cartridge includes the first counter and the second counter.

15. The control method according to claim 11, wherein the period corresponding to the printing process starts at a start of printing one page of a print data, and wherein the control method further includes:

counting up the first counter when feeding a sheet for executing the printing process; and counting up the second counter when executing the printing process, in a case where toner application amount included in the print data is greater than a threshold.

16. The control method according to claim 11, wherein the period corresponding to the printing process starts at a completion of printing one page of a print data, and wherein the control method further includes:

counting up the first counter at the completion; and counting up the second counter at the completion in a case where toner application amount included in the print data is greater than a threshold.

17. The control method according to claim 11, wherein the image forming apparatus further comprises a third counter, and wherein the control method further includes:

controlling the third counter not to count up during the period corresponding to the printing process, in a case where there is no setting for rotational speed reduction control for the heating rotary body; and controlling the third counter to count up during the period corresponding to the printing process, in a case where there is a setting for rotational speed reduction control for the heating rotary body.

18. The control method according to claim 11, wherein the control method further includes:

setting each page in the print data whether or not to perform high-chroma printing; and controlling the printer engine in the second mode when a page in the print data is set to perform the high-chroma printing.

19. The control method according to claim 11, wherein the heating rotary body is a cartridge having the first counter and the second counter.

20. The control method according to claim 11, further comprising an interface to communicate with a server, wherein the control method further includes sending an alarm to the server when at least one of the first counter or the second counter becomes greater than a predetermined value.

21. A non-transitory computer-readable storage medium storing a program for causing a computer to execute a control method for an image forming apparatus including a printer engine that causes a heating rotary body to support and convey a sheet with a toner image formed thereon and performs an image formation on the sheet, a first counter used for counting up when one page is printed with one of first chroma and second chroma higher than the first chroma, and a second counter used for counting up when one page is printed with the second chroma, wherein the control method comprises:

controlling the printer engine to perform, during a printing process, the image formation on sheets in a first mode in which a toner image based on a piece of image data is formed with a first amount of toner, or a second mode in which a toner image based on the piece of image data is formed with a second amount of toner larger than the first amount of toner;

controlling the first counter to count up during a period corresponding to the printing process;

controlling the second counter not to count up during the period corresponding to the printing process, in a case where the printer engine is controlled in the first mode; and controlling the second counter to count up during the period corresponding to the printing process, in a case where the printer engine is controlled in the second mode.

* * * * *